UNITED STATES PATENT OFFICE 1,953,905

PREPARATION OF ACETIC ACID

Ralph Lyman Brown, Syracuse, N. Y., assignor to Atmospheric Nitrogen Corporation, New York, N. Y., a corporation of New York No Drawing. Application June 20, 1931,
Serial No. 545,848

7 Claims. (Cl. 260—116)

This invention relates to the synthetic production of acetic acid and its derivatives by catalysis, and more particularly to a manner in which the activity of the catalyst may be enhanced.

The primary object of the invention is to provide a procedure in connection with the catalytic production of acetic acid from carbon monoxide and methanol in accordance with which the activity of the catalyst may be maintained and the yield of acetic acid increased.

Other objects of the invention are to provide a procedure for minimizing the side reactions taking place during the catalytic production of acetic acid from carbon monoxide and methanol whereby the conversion of the reactants and primary products into carbonaceous material is decreased, and to promote the activity of the catalytic agent.

Other objects of the invention will in part be obvious and will in part appear hereinafter.

In the production of acetic acid by reaction of a mixture containing carbon monoxide and methanol in the presence of a catalyst, the principal reactions are accompanied by side reactions resulting in the decomposition of the reactants and intermediate or primary products, and in a decrease of catalytic activity due, it is believed, to a change in the composition of the catalyst surface layer and to deposition of carbonaceous material, arising from the decomposition reactions, on the catalyst. It is recognized that it has been proposed heretofore to add water along with methyl ether or other methanol yielding compounds as a means of supplying methanol, and that it has also been added for the purpose of increasing the amount of acetic acid formed by interaction with or hydrolysis of the methyl acetate which is produced along with acetic acid. Both of these functions of the added water are incidental and the results obtained by these operations can be conducted equally well outside of the acetic acid converter and with the same final results, inasmuch as these functions are based upon the following equilibrium relationships:

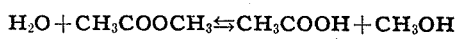

I have found that the activity of the catalyst may be promoted and that the activity and composition of the surface layer of the catalyst may be maintained during the production of acetic acid from carbon monoxide and methanol by introducing a certain amount of water along with or into the reaction mixture. The water thus added functions in a catalytic manner, inasmuch as the total formation of acetic acid, i. e., acetic acid plus methyl acetate, is materially increased. The increase in rate of formation varies according to the relationship of the other operative factors, as temperature, pressure, methanol input, space velocity, etc., and it has been found that this rate may be increased as much as 100% by the introduction of water. The water added, therefore, since it exerts a catalytic effect, may be considered as acting in the rôle of a promoter.

By way of explanation, it may be added that water does not of itself enter into the reaction between carbon monoxide and methanol to form acetic acid, as will be clear from the following equation:

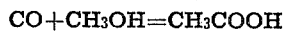

and further that the magnitude of its effect is many times that which may possibly arise through the indirect influences or secondary reactions involved in the equilibria, of which the foregoing equation is the basic one. This will be obvious from the following outline of equilibrium conditions:

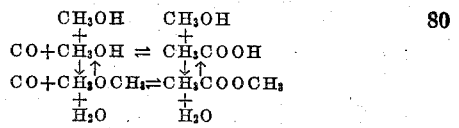

Further, I have found that the addition of water to the reaction mixture, besides promoting the activity of the catalyst and thus increasing the yield exerts a prolonging effect upon the life of the catalyst by maintaining the composition of the surface layer of the catalyst and by retarding the deposition of carbonaceous material and other side reactions.

In the practice of the invention a mixture of carbon monoxide and methanol may be reacted in the presence of a catalytic agent with the addition of water to the reaction mixture in an amount which may vary, depending upon the operating conditions, including the composition of the catalyst and which, for example, may be from 0.2-2.2 mols of water per mol of methanol in the case of a silica-phosphoric acid catalyst.

The invention will be more particularly described and illustrated in connection with the use of a silica-phosphoric acid catalyst, the subject matter of co-pending application Serial No. 545,847.

A catalytic agent is prepared by mixing silica, silicic acid or silica gel with ortho phosphoric acid in the proper stoichiometric proportions corresponding to silicyl meta phosphate $SiO(PO_3)_2$ heating for a period of time at a temperature of about 260° C. until the mass sets to a semi-solid, then further heating at about 500° C. The resulting solid is then crushed and graded to size, for example, 6-8 mesh. The catalyst thus prepared is introduced into a converter, preferably silver-lined, which converter is capable of withstanding high pressures and is fitted with the usual accessories for high pressure synthesis. The reaction mixture containing carbon monoxide and methanol, to which water and a little phosphoric acid has been added, may then be passed over the catalyst at a pressure of from 100-300 atmospheres, at a temperature of from 350-400° C., and at a space velocity of from 3000-7000. The ratio of CO to methanol may vary, for example, from about 10 to 2 mols carbon monoxide to 1 mol methanol, and the amount of phosphoric acid admitted may be from 0.005 to 0.03 mol per mol of methanol. The amount of water introduced into the reaction mixture may be from 0.2 to about 2 mols per mol of methanol. The mixture of reaction products leaving the converter may be condensed in a suitable condenser, and the acetic acid separated therefrom by distillation, utilizing preferably a rectifying column for this purpose.

As above indicated, the amount of water which may be introduced will vary, depending upon the operative conditions, as pressure, temperature, space velocity, reactant ratio, etc., under which the process is conducted. For 200 atmospheres operation the preferred ratio is from about 0.3-0.8 mol per mol of methanol, or about .5 mol optimum. It was found that the introduction of 0.5 mol of water per mol of methanol occasioned an increase of about 100% in the yield of total acetic acid. For operating pressures of 100 and 300 atmospheres optimum water content was found to be 1 and .4 mol respectively per mol methanol.

Generally speaking, the water vapor is used up to an amount beyond which any increase ceases to have any substantial effect on catalytic activity or side reactions as above described or until the dilution of the reaction gases becomes excessive.

The water is conveniently introduced into the system along with the methonal, the methanol-water mixture being injected by a pump into the CO gas stream and there vaporized, preferably in a vaporizing chamber just ahead of the converter. The addition of water to the reaction mixture, as herein described, effects an increase in the activity of the catalyst and in the yield of acetic acid, obtained by passing a mixture of carbon monoxide and methanol thereover, by decreasing or minimizing the decomposition of the reactants and primary products to form carbonaceous material, and by acting per se as a catalyst or promoter. Further, the introduction of water affects the surface layer of the catalyst to maintain the composition thereof such that the life of the catalyst is prolonged with accompanying maintenance of yield, and it effects substantial elimination of the side reactions giving rise to carbonaceous material which deposits upon the catalyst and decreases its activity.

The term "space velocity" as used herein denotes the volume of non-condensable gas measured at room temperature (22°-25° C.) and atmospheric pressure entering the converter per hour per unit volume of catalyst.

While I have described my invention with particular reference to a silica phosphoric acid catalyst, it is also applicable to other types of catalysts of which phoshoric acid is a constituent such as a calcium, thorium or zirconium phosphate material or phosphoric acid on a coke carrier.

I claim:

1. A process which comprises reacting a mixture containing carbon monoxide and methanol in the presence of a phosphoric acid catalyst and introducing water into the reaction mixture in an amount not less than about 0.2 mol per mol of methanol.

2. A process which comprises reacting a mixture containing carbon monoxide and methanol in the presence of a phosphoric acid catalyst and introducing water into the reaction mixture in an amount of from about 0.3 to 0.8 mol per mol of methanol.

3. A process which comprises reacting carbon monoxide and methanol in the presence of water vapor and a silica-phosphoric acid catalyst adapted for acetic acid formation.

4. A process which comprises reacting a mixture containing carbon monoxide and methanol in the presence of a silica-phosphoric acid catalyst, and introducing water into the reaction mixture.

5. A process which comprises reacting a mixture containing carbon monoxide and methanol in the presence of about 0.2-2 mols water vapor per mol of methanol and a silica-phosphoric acid catalyst adapted for acetic acid formation.

6. A process which comprises reacting a mixture containing carbon monoxide and methanol in the presence of a silica-phosphoric acid catalyst, and under about 200 atmospheres pressure, and introducing water into the reaction mixture in an amount of about 0.3-0.8 mol per mol of methanol.

7. A process which comprises reacting a mixture containing carbon monoxide and methanol in the presence of a phosphoric acid catalyst and of water, said water being present in an amount not less than about 0.2 mol per mol of methanol.

RALPH LYMAN BROWN.